(12) United States Patent
Arregoces et al.

(10) Patent No.: US 7,571,470 B2
(45) Date of Patent: Aug. 4, 2009

(54) ONE ARM DATA CENTER TOPOLOGY WITH LAYER 4 AND LAYER 7 SERVICES

(75) Inventors: Mauricio Arregoces, Rancho Palos Verdes, CA (US); Maurizio Portolani, Milpitas, CA (US); Christopher M. O'Brien, Fuquay Varina, NC (US); Stefano Testa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 11/089,754

(22) Filed: Mar. 24, 2005

(65) Prior Publication Data

US 2006/0095579 A1    May 4, 2006

Related U.S. Application Data

(60) Provisional application No. 60/623,810, filed on Oct. 28, 2004.

(51) Int. Cl.
*G06F 21/00*    (2006.01)
(52) U.S. Cl. ............... 726/11; 726/15; 713/153; 709/238; 709/239
(58) Field of Classification Search .......... 726/11, 726/15; 709/229, 238–244; 713/153
See application file for complete search history.

(56) References Cited

U.S. PATENT DOCUMENTS

2003/0106067 A1* 6/2003 Hoskins et al. ............. 725/119
2006/0090136 A1* 4/2006 Miller et al. ................ 715/734
2006/0184926 A1* 8/2006 Or et al. .................... 717/168

OTHER PUBLICATIONS

Cisco Systems, Inc., "Data Center Design and Implementation with Cisco Catalyst 6500 Service Modules (Version 2.0)", Copyright © 2004, 88 pages.
Cisco Systems, Inc., "Networking Solutions—Business Ready Data Center", Copyright © 1992-2005, 3 pages.
International Engineering Consortium, "On-Line Education—Switched Broadband Internet Protocol (IP) Service", Copyright © 2004, 2 pages.
Cisco Systems, Inc., "White Paper—Policy-Based Routing", Copyright © 1992-2000, 7 pages.
Cisco Systems, Inc., "CSM One-Arm Design in the Data Center (Version 2.0)", Copyright © 2004, 20 pages.

(Continued)

*Primary Examiner*—Tongoc Tran
(74) *Attorney, Agent, or Firm*—Trellis IP Law Group, PC

(57) ABSTRACT

A one-arm data center topology routes traffic between internal sub-nets and between a sub-net and an outside network through a common chain of services. The data center topology employs layer 4 services on a common chassis or platform to provide routing and firewall services while reducing the number of devices necessary to implement the data center and simplifying configuration. Load balancing is provided by a load balancing device. In the one-arm topology, policy based routing or client network address translations or NAT pushes traffic to the CSM.

20 Claims, 4 Drawing Sheets

OTHER PUBLICATIONS

Cisco Systems, Inc., "Products & Services—Cisco Catalyst 6500 Series Switches—VLAN Security White Paper", Copyright © 1992-2005, 13 pages.

Cisco Systems, Inc., "White Paper—Cisco Web Network Services for Content Distribution and Delivery Services", Copyright © 1992-2000, 14 pages.

Cisco Systems, Inc., "Products & Services—Cisco Services Modules—Cisco CSM Architecture White Paper", Copyright © 1992-2005, 19 pages.

Cisco Systems, Inc., "Configuring CSM in Router Mode with L7 Policies", Copyright © 1992-2004, 15 pages.

* cited by examiner

ONE ARM DATA CENTER TOPOLOGY WITH LAYER 4 AND LAYER 7 SERVICES

CROSS-REFERENCES TO RELATED APPLICATIONS

This application claims priority from commonly assigned provisional patent application entitled "Data Center Network Design And Infrastructure Architecture" by Mauricio Arregoces and Maurizio Portolani, application No. 60/623,810, filed Oct. 28, 2004 the entire disclosure of which is herein incorporated by reference.

BACKGROUND AND SUMMARY OF THE INVENTION

Data centers are an integral element in supporting distributed client/server computing. Data centers enable, the use of powerful applications for the exchange of information and transaction processing and are critical to the success of modern business. A typical n-tier data center uses multiple physical devices. These devices, shown in FIG. 1, may include a firewall 10 that provides access security for a server farm having web servers 11 and 12, a Layer 3 switch 13 that performs routing functions and a content switch 14 to load balance traffic to web servers 11 and 12. Each of the web servers 11 and 12 may have dual network interface cards for redundancy reasons or may be further connected to a backend network to communicate with a tier of application servers 19 and 20 through switches 15 and 16, a second tier of firewalls 17 and a content switch 18. Other servers, such as mail servers, file servers, DNS servers, streaming servers or servers directed to other specific tasks may be included in the data center as is well understood in the art.

Application servers 19 and 20 are further connected to another backend network through switches 21 and 24, another tier of firewalls 22 and a content switch 23 to a tier of database servers 25 and 26.

One problem with the topology of the n-tier data center is that it requires too many physical devices, is expensive to set up and operate and is difficult to manage. Thus setting up an n-tier data center to service requests from a large number of users is not only expensive but also difficult to maintain. What is needed is a simplified data center topology that reduced the number of physical devices, is inexpensive to set up and easy to maintain.

To address this need, an embodiment of a prior art data center is shown in FIG. 2 with a simplified topology. In this prior art embodiment, a firewall eliminates the need for a separate physical firewall device at more than one tier. Thus, as shown in FIG. 2, a single virtual firewall 28 interfaces a plurality of content switches 29-31, web servers 32, application servers 33 and database servers 34 to Layer 3 switch 27. It is important to note that layer 3 switch 27 also replaces the multiple switches 15, 16, 21 and 24 required in figure one. The layer 3 switch provide both connectivity for all the servers as well as the logical separation between the different types of servers, web, application and data-base, through the use of Virtual Local Area Networks or VLANs. VLANs 35-37 couple the servers 32, 33 and 34, and the respective content switches 29-31 to firewall 28. Traffic from a server, such as one web server 32 to a database server 34 will pass through firewall 28 to be routed to database server 34 by switch 27. The traffic must pass through firewall 28 a second time before reaching database servers 34 thereby providing secure communication between servers coupled to different VLANs. While this embodiment reduces the number of devices, it is still expensive to set up and maintain. Thus, by replacing the multiple firewalls 10, 17, and 22 shown in FIG. 1 with a single firewall 28, the data center topology in FIG. 2 provides the same functionality but with considerably fewer physical devices because of the elimination of switches 15, 16, 21 and 24. Layer 3 switch 27 in FIGS. 2 and 3 and the remaining figures is also abstracted to provide a simplified view of the layer 2 connectivity for the server farm tiers depicted in FIG. 1, in addition to the layer 3 routing functions.

In another data center topology, using the single firewall 28 coupled by a content switch reduces the number of physical devices. By tightly linking firewall 28 with content switch 38 operating in bridge mode, further simplification is achieved. The embodiment shown in FIG. 3 affords further reduction in the number of physical devices because content switch 38 and firewall 28 are mounted in one common chassis 39 as two service blades. In FIG. 3, content switch 38 replaces the content switching instances 29, 30 and 31 shown in FIG. 2. In this embodiment, firewall 28 and content switch 38 perform the work of up to ten physical devices compared to the topology shown in FIG. 1. While the topology shown in FIG. 3 is greatly simplified, the transfer of traffic between the content switch, firewall and router is not easily configured. Further, the firewall does not preserve traffic segmentation and it must still perform some routing functions. Similarly, the content switch must also perform some routing functions in addition to its load balancing functions, which is undesirable.

To overcome these disadvantages of the prior art data center topology, a topology in accordance with the present invention efficiently routes traffic on internal sub-nets as well as traffic routed between a sub-net and an outside network. The data center topology employs layer 7 and layer 4 services on a common chassis or platform to provide routing, load balancing and firewall services to simplify data center topology. Advantageously, the number of devices necessary to implement the data center is reduced and configuration is simplified.

The foregoing and additional features and advantages of this invention will become apparent from the detailed description and review of the associated drawing figures that follow.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, parts, and/or the like. In other instances, well-known structures, materials, or operations are not specifically shown or described in detail to avoid obscuring aspects of embodiments of the present invention.

To overcome the disadvantages of prior art data center topology, a topology in accordance with the present invention efficiently routes traffic between internal sub-nets as well as traffic destined to or arriving from an outside network. The data center topology employs layer 7 and layer 4 services on a common chassis or platform to provide routing, load balancing and firewall services to simplify data center topology. Advantageously, the number of devices necessary to implement the data center is reduced and configuration is simplified.

Figure 1:
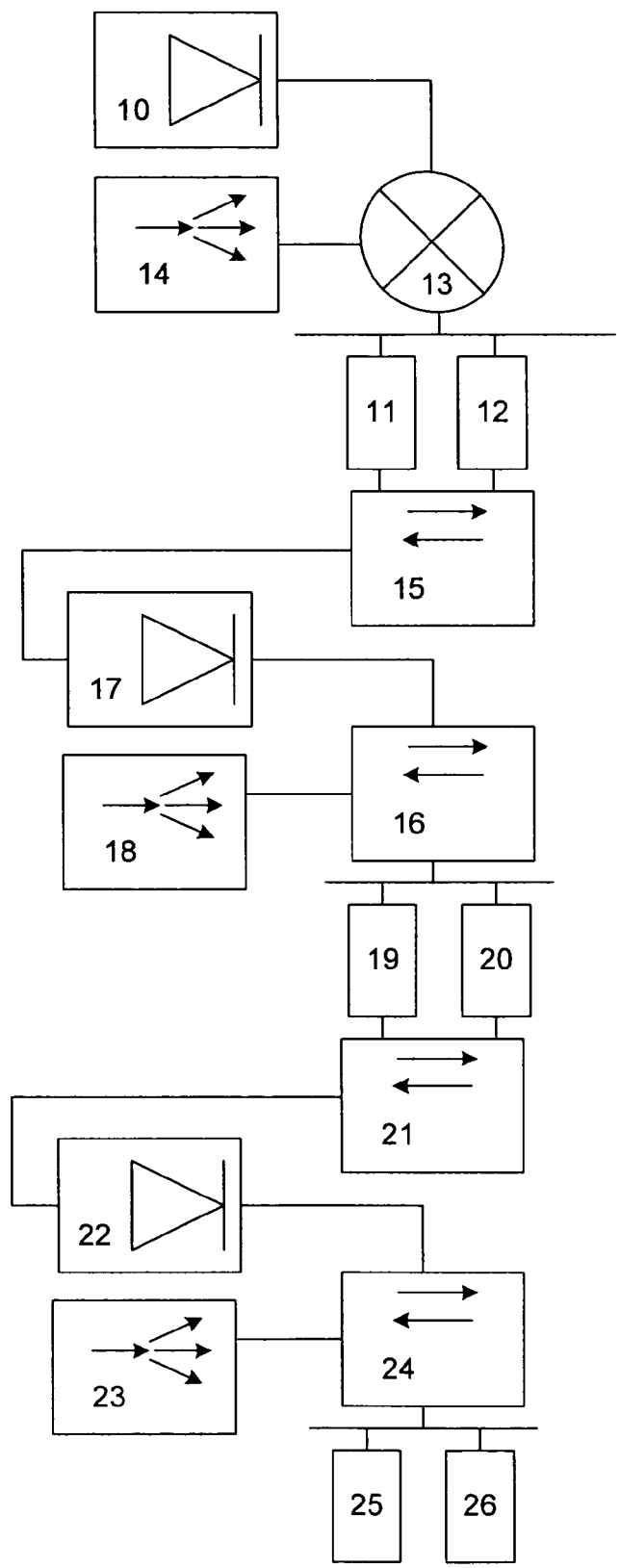
FIG. 1 is a simplified block diagram illustrating prior art data center topology.
Figure 2:
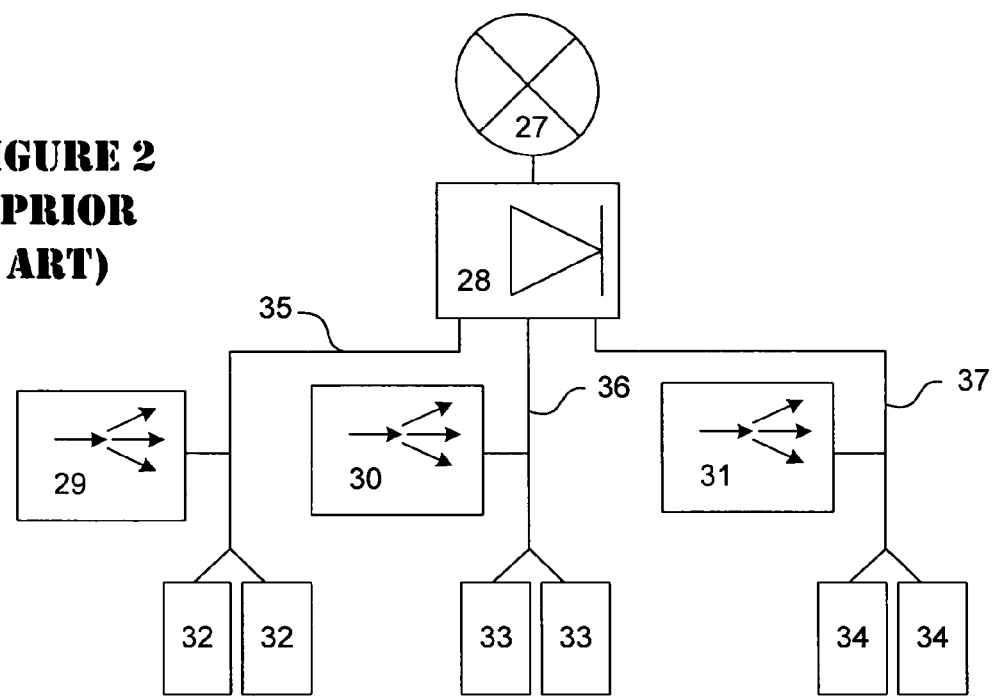
FIG. 2 is another simplified block diagram illustrating prior art one-arm data center topology.
Figure 3:
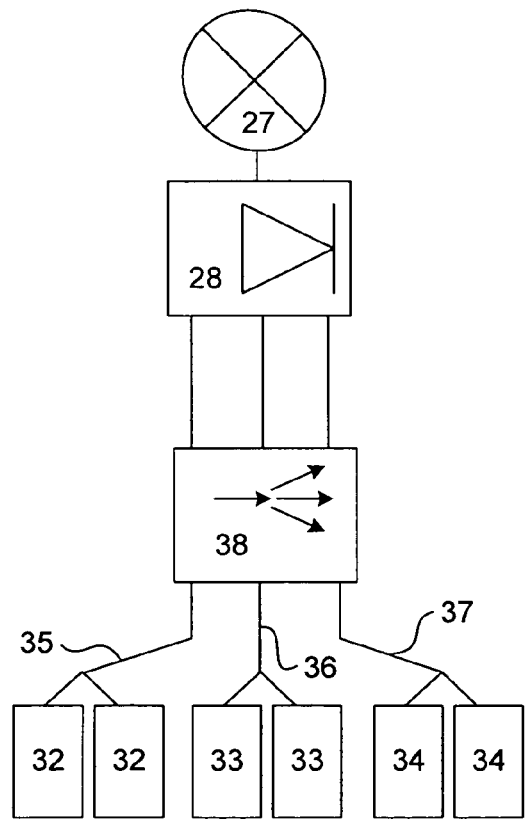
FIG. 3 is a simplified block diagram illustrating prior art data center topology having transparent Layer 4 and Layer 7 services.
Figure 4:
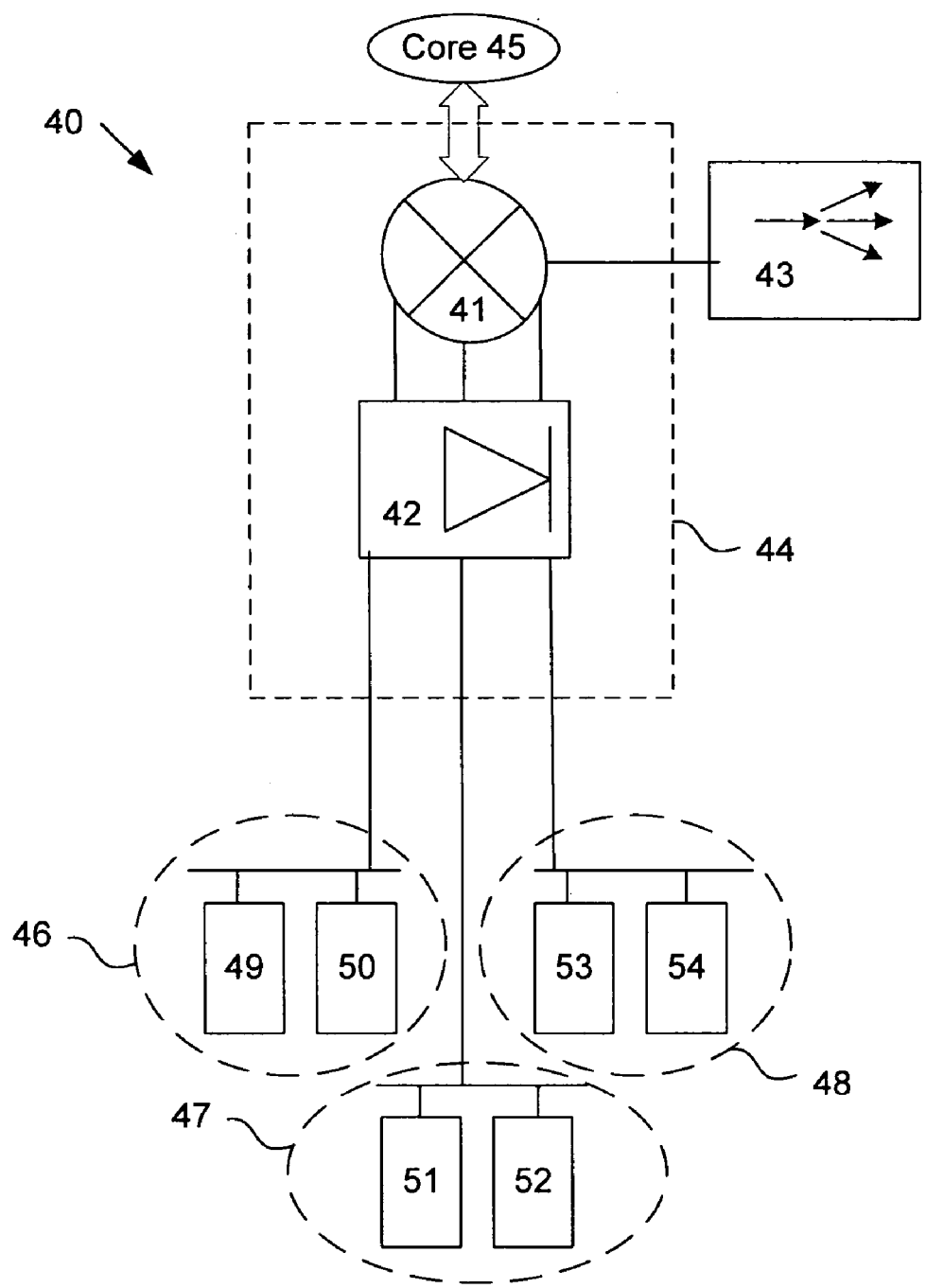
FIG. 4 illustrates an improved one-arm data center topology in accordance with an embodiment of the present invention.

Referring now to the drawings more particularly by reference numbers, a representative data center 40 configured in a one-arm topology in accordance with an embodiment of the present invention is illustrated in FIG. 4. In this embodiment, a transparent firewall provides multiple outside interfaces that permits efficient routing of service requests between inside sub-nets and between inside sub-nets and the outside network. Data center 40 comprises a router 41 and a transparent firewall component 42 on a common chassis 44 with a load balancing content switch 43 coupled to router 41 in a one arm fashion.

Router 41 is a device, or network appliance, that determines the next network point to which information packets, or traffic, should be forwarded toward its destination. Router 41 in one preferred embodiment is either the Cisco Catalyst 6500 or the Cisco 7600 series router, both of which are commercially available from Cisco Systems, the parent corporation of the present assignee. In some network embodiments, router 41 may be implemented in software executing in a computer or it may be part of a network switch. Router 41 is connected to at least two networks, such as external core network 45 and the internal network of data center 40.

Functionally, the router 41 determines the path to send each information packet based on the router's understanding of the state of the networks. Because firewall 42 operates in transparent mode, router 41 functions as the gateway for sub-nets 46, 47 and 48. Each sub-net includes a plurality of servers that are illustrated by servers 49 and 50 in sub-net 46, servers 51 and 52 in sub-net 47 and servers 53 and 54 in sub-net 48. The server tier in each sub-net may comprise various types of servers such as application servers, database servers, mail servers, file servers, DNS servers or streaming servers by way of example.

Router 41 creates and maintains available routes and uses this information to determine the best route for a given packet traversing either to or from sub-net, 46, 47 or 48. Although each sub-net 46-48 is illustrated having a pair of servers, it is to be understood that a subnet may comprise many nodes coupled by a local area network or LAN. A contiguous range of IP address numbers identifies each node in the sub-net. Subnets are often employed to partition networks into logical segments for performance, administration and security purposes.

Rather than provision each sub-net with a dedicated firewall, firewall component 42 is preferably an integrated firewall module marketed by Cisco as the Firewall Services Module (FWSM). The FWSM may be configured to provide multiple virtual firewalls within a single hardware appliance. Firewall 42 provides stateful connection-oriented firewall services. The firewall creates a connection table entry for each session flow and applies a security policy to these connection table entries to control all inbound and outbound traffic.

Firewall component 42 functions to enforce network access policy and prevent unauthorized access to data center sub-nets 46-48. A network access policy defines authorized and unauthorized users of the servers as well as the types of traffic, such as FTP or HTTP that is allowed across the network. Firewall component 42 controls access to certain portions of the data center by defining specific source address filters that allow users to access certain sub-nets but not other sub-nets. Firewall component 42 does not perform any routing functions.

Rather than placing discrete firewalls at all access points where a sub-net sends and receives traffic from other networks or sub-nets, the present invention includes a firewall configured as multiple virtual firewalls, called security contexts, within the same hardware appliance. A security context is a virtual firewall that has its own security policies and interfaces. Since firewall component 42 is a transparent virtual firewall, it operates in-line with the sub-net it is protecting. Firewall component 42 does not require the configuration of static routes on 41, 42 or 43. Another key advantage of the transparent virtual firewall is that has no IP addresses so it is unreachable and invisible to the outside world.

Components 42 and 43 are preferably fabric connected to router 41. Switching fabric is the combination of hardware and software that moves traffic coming in to one of the components and out to the next component. Switching fabric includes the switching infrastructure linking nodes, and the programming that allows switching paths to be controlled. The, switching fabric is independent of any bus technology and infrastructure.

In the one arm topology, content switch 43 is not in the main traffic path between router 41 and subnets 46, 47 and 48. Basic Layer 3 routing pushes client-to-server traffic to content switch 43, policy based routing or client network address translation pushes server-to-client traffic to content switch 43

Content switch 43 is preferably a Content Switching Module such as the CSM commercially available from Cisco Systems, Inc. the parent corporation of the assignee of the present invention. In alternative embodiments, content switch 43 may be an external content switching device such as the Content Switching Service or CSS device, which is a switch also available from Cisco Systems. In other embodiments, other content based or service based switches could be also be used.

The primary purpose of content switch 43 is to implement load balancing policies. These policies describe how connections and requests are to be distributed across the servers in each sub-net eligible to receive the traffic. Other policies may be implemented by content switch 43. For example, content switch 43 may be configured to describe persistence policies to determine whether a connection must stay with a particular server in the sub-net until a particular transaction or unit of work is complete. Content switch 43 may also be configured to implement server failure policies or other content-specific policies to specify how different types of content are to be treated. In other embodiments, content switch 43 may be configured to implement device-specific policies to specify different treatment for different types of servers or other network appliances.

In general, content switch 43 provides Layer 4-Layer 7 services for HTTP requests, FTP file transfer, e-mail and other network software services. Content switch component 43 accesses information in the TCP and HTTP headers of the packets to determine the complete requested URL and any cookies in the packet. Once content switch 43 determines the best server for an inbound request, it is passed to that server through router 41 and firewall 42.

Figure 5:
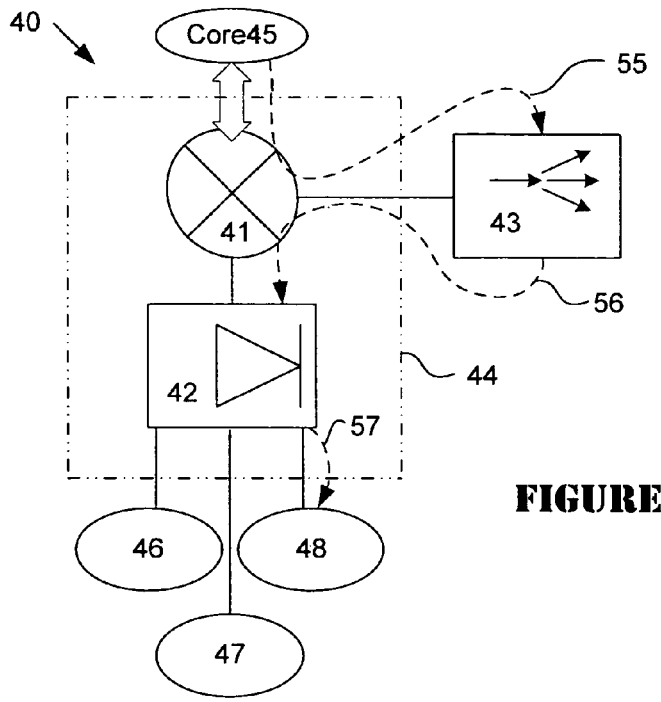
FIG. 5 shows a traffic flow diagram in accordance with an embodiment of the present invention.

FIG. 5 illustrates traffic flow between the outside network core 45 and a sub-net of data center 40. Dashed lines 55, 56 and 57 illustrate the traffic flow path. Outside traffic flows along path 55 from core 45 to router 41, which applies routing to push the traffic to content switch 43. Content switch component 43 selects the appropriate server within the designated sub-net and sends the traffic to router 41 and firewall 42 along traffic flow path 56. Firewall 42 applies the configured security policies and passes the traffic to subnet 48 along traffic flow path 57. Return traffic traverses the same path in reverse, passing through firewall 42 and content switch 43 before being routed to the requester by router 41.

Figure 6:
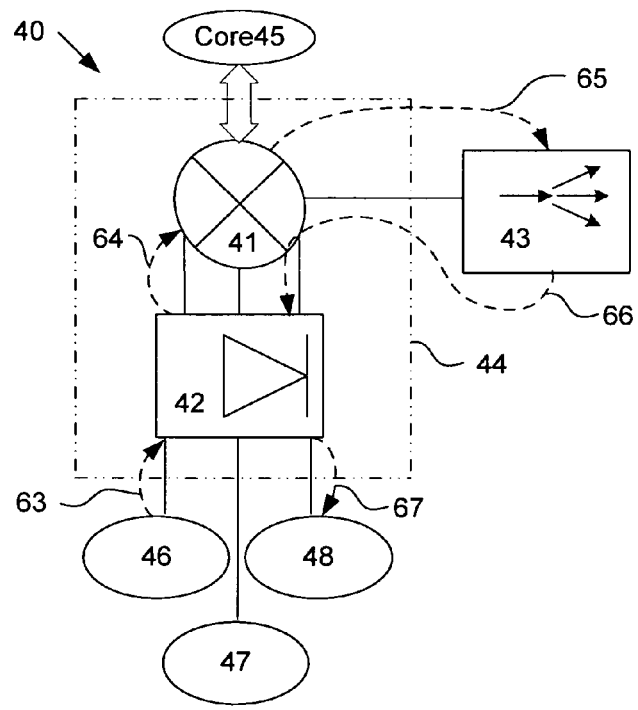
FIG. 6 shows another traffic flow diagram in accordance with an embodiment of the present invention.

FIG. 6 illustrates traffic flow between two sub-nets, such as from sub-net 46 to sub-net 48, which is a typical server-to-server communication, required as an example when a first tier of web servers are accessing back-end data-base server. Traffic traverses paths as indicated by dashed lines 63-67. Specifically, traffic from sub-net 46 follows a path 63 to firewall 42, which applies stateful inspection to protect against internal and external security breaches. If this traffic requires load balancing, it is then passed to content switch 43 through router 41 along paths 64 and 65. Content switch 43 applies load balancing policies for subnet 48 before sending the traffic back to router 41 and firewall 42 along traffic path 44. Firewall 42 again applies stateful inspection before passing the traffic along path 67 to the server in subnet 48 specified by content switch 43. Similarly, any outgoing return traffic the same paths in reverse, passing through firewall 42 and, if it is a load balanced flow, through content switch 43 before being routed to the requester by router 41.

All data center traffic, whether originating from the outside network or between sub-nets, passes through the same chain of services. Further since all traffic passes through firewall component 42 all traffic is stateful inspected even for server-to-server communication within the data center. Advantageously, since the firewall and the content switch are dedicated to stateful inspection and load balancing, respectively, neither device needs to be configured for routing functions. There is no need to configure OSPF or other routing protocol at either the firewall or content switch thereby simplifying the task of setting up and maintaining the data center.

Accordingly, the present invention provides a new data center topology that uses a virtual transparent firewall and a load-balancing module and achieves segregation between traffic paths. The topology replaces multiple appliances with a simplified configuration of a L3 switch, firewall in a single chassis in conjunction with a content switch. The topology allows bypassing the content switch for traffic that does not require load balancing, thus freeing resources in the content switch and allowing for high scalability. Examples of traffic that does not require load balancing include backup traffic, traffic to server sub-nets that do not require content switch services and server-originated connections to remote services.

Accordingly, the present invention provides a data center having a secure and scalable topology. This topology may use existing Cisco products in a manner that differs from the designed use.

Although the invention has been described with respect to specific embodiments thereof, these embodiments are merely illustrative, and not restrictive of the invention. For example, the network may include different routers, switches, servers and other components or devices that are common in such networks. Further, these components may comprise software algorithms that implement connectivity functions between the network device and other devices in a manner different from that described herein.

In the description herein, specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain or store the program for use by or in connection with the instruction execution system, apparatus, system or device. The memory can be, by way of example only but not by limitation, a semiconductor system, apparatus, system, device, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A data center comprising:
   a Layer 3 switch functioning as a router;
   a virtual transparent firewall coupled to said router;
   a plurality of sub-nets coupled to said firewall such that traffic between different sub-nets is segregated by said firewnotall;
   a content switch coupled to said layer 3 switch in a one arm fashion, the one arm fashion positioning the content switch out of a main traffic path from the Layer 3 switch to the virtual transparent firewall to the plurality of sub-nets; and
   means for routing traffic between sub-nets such that all traffic to a sub-net is statefully inspected by routing traffic from a first subnet through the virtual transparent firewall to the Layer 3 switch and, when load balancing is required, to the content switch for load balancing, wherein the traffic is routed back through the layer 3 switch and the virtual transparent firewall to a second subnet.

2. The data center of claim 1 whereby said firewall is configured for only implementing a security policy of said data center.

3. The data center of claim 1 whereby said firewall is configured for only implementing a security policy for each sub-net of said data center.

4. The data center of claim 3 wherein said content switch is configured only for implementing a load balancing policy for said data center.

5. The data center of claim 4 wherein said content switch is configured only for implementing a different load balancing policy for at least one of said sub-nets.

6. The data center of claim 5 wherein server-to-client traffic is pushed to said content switch by policy based routing.

7. The data center of claim 5 wherein server-to-client traffic is pushed to said content switch by client NAT.

8. A method for routing traffic-in a data center, said method comprising:
   configuring a virtual transparent firewall for performing stateful inspection of traffic;
   configuring a load balancing device to implementing load balancing policy, the load balancing device coupled to a router configured to route data center traffic, the load balancing device positioned in a one arm fashion out of a main traffic path from the router to the virtual transparent firewall to a plurality of subnets;
   routing, using the router, data center traffic through said firewall to the plurality of subnets; and
   routing the data center traffic from a first subnet through the virtual firewall to the router, and when load balancing is required, to the load balancing device for load balancing, wherein the data center traffic is routed back through the router and the virtual transparent firewall to a second subnet.

9. The method of claim 8 for routing traffic in a data center further comprising using policy based routing to route server-to-client traffic to said load balancing device.

10. The method of claim 8 for routing traffic in a data center further comprising using client network address translation to route server-to-client traffic to said load balancing device.

11. The method of claim 8 for routing traffic in a data center further comprising pushing traffic to said load balancing device by client network address translation.

12. The method of claim 8 for routing traffic in a data center further comprising maintaining traffic segmentation between through said firewall.

13. The method of claim 12 for routing traffic in a data center further comprising restricting all routing functions to a router.

14. A system configured to route traffic in a data center, the system comprising:
   a router configured to route data center traffic;
   a virtual transparent firewall configured to perform stateful inspection of traffic; and
   a load balancing device configured to implementing load balancing policy, the load balancing device coupled to the router, the load balancing device positioned in a one arm fashion out of a main traffic path from the router to the virtual transparent firewall to a plurality of subnets;
   wherein the router is configured to route data center traffic through said firewall to the plurality of subnets; and
   wherein the data center traffic is routed from a first subnet through the virtual transparent firewall to the router and, when load balancing is required, to the load balancing device for load balancing, wherein the data center traffic is routed back through the router and the virtual transparent firewall to a second subnet.

15. The data center of claim 14 wherein said router performs all routing and switching functions for said data center.

16. The data center of claim 15 wherein said firewall is configured to implement stateful inspection of said traffic.

17. The data center of claim 14 wherein said load balancing device is configured to implement load balancing policy for said data center.

18. The data center of claim 17 wherein traffic between subnets is segregated and routed by said router such that all traffic is subject to at least stateful inspection by said firewall.

19. The data center of claim 16 wherein said load balancing device is bypassed for traffic that does not require load balancing.

20. The data center of claim 19 wherein server-to-client traffic is pushed to said load balancing device by client network address translation (NAT).

* * * * *

UNITED STATES PATENT AND TRADEMARK OFFICE
CERTIFICATE OF CORRECTION

| | |
|---|---|
| PATENT NO. | : 7,571,470 B2 |
| APPLICATION NO. | : 11/089754 |
| DATED | : August 4, 2009 |
| INVENTOR(S) | : Mauricio Arregoces et al. |

It is certified that error appears in the above-identified patent and that said Letters Patent is hereby corrected as shown below:

Column 7, line 31: change "firewnotall" to --firewall--.

Column 8, line 48: change "data center" to --system--;

line 49: change "data center" to --system--;

line 50: change "data center" to --system--;

line 52: change "data center" to --system--;

line 54: change "data center" to --system--;

line 55: change "data center" to --system--;

line 58: change "data center" to --system--;

line 61: change "data center" to --system--.

Signed and Sealed this

Second Day of February, 2010

David J. Kappos
*Director of the United States Patent and Trademark Office*